(12) United States Patent
Groen (10) Patent No.: US 8,944,365 B2
(45) Date of Patent: Feb. 3, 2015

(54) MISSION-ADAPTIVE ROTOR BLADE

(75) Inventor: David L. Groen, Murray, UT (US)

(73) Assignee: Groen Brothers Aviation, Inc., Salt Lake City, UT (US)

( * ) Notice: Subject to any disclaimer, the term of this patent is extended or adjusted under 35 U.S.C. 154(b) by 407 days.

(21) Appl. No.: 13/282,877

(22) Filed: Oct. 27, 2011

(65) Prior Publication Data

US 2012/0153073 A1 Jun. 21, 2012

Related U.S. Application Data

(60) Provisional application No. 61/409,482, filed on Nov. 2, 2010, provisional application No. 61/409,494, filed on Nov. 2, 2010, provisional application No. 61/626,783, filed on Oct. 3, 2011.

(51) Int. Cl.
| | |
|---|---|
| *B64C 27/473* | (2006.01) |
| *B64C 27/72* | (2006.01) |
| *B64C 27/02* | (2006.01) |
| *B64C 27/00* | (2006.01) |
| *B64C 27/59* | (2006.01) |
| B64C 27/18 | (2006.01) |
| B64C 27/26 | (2006.01) |

(52) U.S. Cl.
CPC ............ *B64C 27/473* (2013.01); *B64C 27/023* (2013.01); *B64C 27/008* (2013.01); *B64C 27/59* (2013.01); *B64C 27/72* (2013.01); *B64C 27/18* (2013.01); *B64C 27/26* (2013.01); *B64C 2027/4736* (2013.01); *B64C 2027/7222* (2013.01); *Y02T 50/34* (2013.01)
USPC ...... 244/17.11; 416/1; 416/132 R; 416/134 A; 416/226; 416/230; 416/240

(58) Field of Classification Search
USPC .......... 244/6, 7 R, 8, 17.11, 17.13, 17.25, 39, 244/46, 48; 416/1, 131, 132 R, 134 A, 226, 416/230, 240, 241 A
See application file for complete search history.

(56) References Cited

U.S. PATENT DOCUMENTS

| | | | | |
|---|---|---|---|---|
| 1,875,597 | A | * | 9/1932 | Heath ............................ 416/230 |
| 2,451,541 | A | * | 10/1948 | Doman ......................... 416/145 |
| 4,022,547 | A | * | 5/1977 | Stanley ......................... 416/230 |
| 4,150,920 | A | * | 4/1979 | Belko et al. ................... 416/145 |
| 4,627,791 | A | * | 12/1986 | Marshall .................... 416/132 R |
| 6,024,325 | A | * | 2/2000 | Carter, Jr. .................... 244/17.25 |
| 6,497,385 | B1 | * | 12/2002 | Wachspress et al. .......... 244/7 R |
| H2057 | H | * | 1/2003 | Veers et al. .................... 416/230 |
| 7,857,598 | B2 | * | 12/2010 | McGeer et al. ............... 416/240 |
| 8,152,465 | B2 | * | 4/2012 | Jaenker et al. .................. 416/23 |
| 2010/0014981 | A1 | * | 1/2010 | McGeer et al. ............... 416/240 |
| 2011/0211959 | A1 | * | 9/2011 | Bianchi et al. ................ 416/131 |

* cited by examiner

*Primary Examiner* — Joseph W Sanderson
(74) *Attorney, Agent, or Firm* — Pate Baird, PLLC (57) ABSTRACT

A rotorcraft may include an airframe and a rotor connected to the airframe. The rotor may include a hub and a rotor blade connected to the hub to extend radially away therefrom. The rotor blade may include biasing fibers, oriented to increase the twist of the rotor blade in response to an increase in the speed of rotation of the rotor corresponding to a mission, task, or maneuver.

16 Claims, 9 Drawing Sheets

MISSION-ADAPTIVE ROTOR BLADE

BACKGROUND

1. Related Applications

This application claims the benefit of U.S. Provisional Application Ser. No. 61/409,482, U.S. Provisional Application Ser. No. 61/409,494, and U.S. Provisional Application Ser. No. 61/626,783. This application incorporates by reference all of the following: co-pending U.S. patent application Ser. No. 13/199,671, filed on Sep. 7, 2011, which claims the benefit of U.S. Provisional Patent Application Ser. No. 61/381,291, filed on Sep. 9, 2010, co-pending U.S. patent application Ser. No. 13/199,684, filed on Sep. 7, 2011, which claims the benefit of U.S. Provisional Patent Application Ser. No. 61/403,099, filed on Sep. 9, 2010, co-pending U.S. patent application Ser. No. 13/199,678, filed on Sep. 7, 2011, which claims the benefit of U.S. Provisional Patent Application Ser. No. 61/403,097, filed on Sep. 9, 2010, co-pending U.S. patent application Ser. No. 13/199,682, filed on Sep. 7, 2011, which claims the benefit of U.S. Provisional Patent Application Ser. No. 61/381,313, filed on Sep. 9, 2010, co-pending U.S. patent application Ser. No. 13/199,681, filed on Sep. 7, 2011, which claims the benefit of U.S. Provisional Patent Application Ser. No. 61/403,111, filed on Sep. 9, 2010, co-pending U.S. patent application Ser. No. 13/199,677, filed on Sep. 7, 2011, which claims the benefit of U.S. Provisional Patent Application Ser. No. 61/381,347, filed on Sep. 9, 2010, co-pending U.S. patent application Ser. No. 13/199,679, filed on Sep. 7, 2011, which claims the benefit of U.S. Provisional Patent Application Ser. No. 61/403,136, filed on Sep. 9, 2010, co-pending U.S. patent application Ser. No. 13/199,720, filed on Sep. 7, 2011, which claims the benefit of U.S. Provisional Patent Application Ser. No. 61/403,134, filed on Sep. 9, 2010, U.S. Provisional Patent Application Ser. No. 61/460,572, filed on Jan. 3, 2011, co-pending U.S. patent application Ser. No. 13/199,719, filed on Sep. 7, 2011, which claims the benefit of U.S. Provisional Patent Application Ser. No. 61/403,098, filed on Sep. 9, 2010, co-pending U.S. patent application Ser. No. 13/199,721, filed on Sep. 7, 2011, which claims the benefit of U.S. Provisional Patent Application Ser. No. 61/403,081, filed on Sep. 9, 2010, co-pending U.S. patent application Ser. No. 13/199,705, filed on Sep. 7, 2011, which claims the benefit of U.S. Provisional Patent Application Ser. No. 61/403,135, filed on Sep. 9, 2010, U.S. Provisional Patent Application Ser. No. 61/466,177, filed on Mar. 22, 2011, U.S. Provisional Patent Application Ser. No. 61/409,475, filed on Nov. 2, 2010, co-pending U.S. patent application Ser. No. 13/199,712, filed on Sep. 7, 2011, which claims the benefit of U.S. Provisional Patent Application Ser. No. 61/403,113, filed on Sep. 9, 2010, U.S. Provisional Patent Application Ser. No. 61/409,478, filed on Nov. 2, 2010, U.S. Provisional Patent Application Ser. No. 61/409,476, filed on Nov. 2, 2010, U.S. Provisional Patent Application Ser. No. 61/409,482, filed on Nov. 2, 2010, U.S. Provisional Patent Application Ser. No. 61/409,470, filed on Nov. 2, 2010, U.S. Provisional Patent Application Ser. No. 61/517,413, filed on Apr. 19, 2011, U.S. Provisional Patent Application Ser. No. 61/468,964, filed on Mar. 29, 2011, U.S. Provisional Patent Application Ser. No. 61/409,487, filed on Nov. 2, 2010, U.S. Provisional Patent Application Ser. No. 61/409,494, filed on Nov. 2, 2010, U.S. Provisional Patent Application Ser. No. 61/456,219, filed on Nov. 2, 2010, U.S. Provisional Patent Application Ser. No. 61/456,221, filed on Nov. 2, 2010, U.S. Provisional Patent Application Ser. No. 61/456,220, filed on Nov. 2, 2010, U.S. Provisional Patent Application Ser. No. 61/432,488, filed on Jan. 13, 2011, U.S. Provisional Patent Application Ser. No. 61/506,572, filed on Jul. 11, 2011, U.S. Provisional Patent Application Ser. No. 61/519,075, filed on May 16, 2011, U.S. Provisional Patent Application Ser. No. 61/519,055, filed on May 16, 2011, U.S. Provisional Patent Application Ser. No. 61/460,573, filed on Jan. 4, 2011, U.S. Provisional Patent Application Ser. No. 61/461,223, filed on Jan. 13, 2011, U.S. Provisional Patent Application Ser. No. 61/429,282, filed on Jan. 3, 2011, U.S. Provisional Patent Application Ser. No. 61/429,289, filed on Jan. 3, 2011, U.S. Provisional Patent Application Ser. No. 61/499,996, filed on Jun. 22, 2011, U.S. Provisional Patent Application Ser. No. 61/575,196, filed on Aug. 17, 2011, U.S. Provisional Patent Application Ser. No. 61/575,204, filed on Aug. 17, 2011, U.S. Provisional Patent Application Ser. No. 61/532,233, filed on Sep. 8, 2011, U.S. Provisional Patent Application Ser. No. 61/539,668, filed on Sep. 27, 2011, and U.S. Provisional Patent Application Ser. No. 61/626,783, filed on Oct. 3, 2011, all of which are hereby incorporated by reference.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

2. The Field of the Invention

This invention relates to rotating wing aircraft (rotorcraft), and, more particularly to rotorcraft relying on autorotation of a rotor to provide lift.

3. The Background Art

Rotorcraft rely on a rotating wing to provide lift. In contrast, fixed-wing aircraft rely on air flow over a fixed wing to provide lift. Fixed-wing aircraft must therefore achieve a minimum ground velocity on takeoff before the lift on the wing is sufficient to overcome the weight of the plane. Fixed-wing aircraft therefore generally require a long runway along which to accelerate to achieve this minimum velocity and takeoff.

In contrast, rotorcraft can take off and land vertically or along short runways inasmuch as powered rotation of the rotating wing provides the needed lift. This makes rotorcraft particularly useful for landing in urban locations or undeveloped areas without a proper runway.

The most common rotorcraft in use today are helicopters. A helicopter typically includes an airframe, housing an engine and passenger compartment, and a rotor, driven by the engine, to provide lift. Forced rotation of the rotor causes a reactive torque on the airframe. Accordingly, conventional helicopters require either two counter rotating rotors or a tail rotor in order to counteract this reactive torque.

Another type of rotorcraft is the autogyro. An autogyro aircraft derives lift from an unpowered, freely rotating rotor comprising two or more rotor blades. The energy to rotate the rotor results from a windmill-like effect of air passing through the underside of the rotor (i.e., autorotation of the rotor). The Bernoulli effect of the airflow moving over the rotor blade surface creates lift. The forward movement of the aircraft comes in response to a thrusting engine such as a motor driven propeller mounted fore or aft.

During the early years of aviation, autogyro aircraft were proposed to avoid the problem of aircraft stalling in flight and to reduce the need for runways. In autogyro aircraft, the relative airspeed of the rotor blades may be controlled or influenced somewhat independent of the forward airspeed of the autogyro, allowing slow ground speed for takeoff and landing, and safety in slow-speed flight.

Various autogyro devices in the past have provided some means to begin rotation of the rotor prior to takeoff (i.e., prerotation). Prerotation may minimize the takeoff distance down a runway. One type of autogyro is the "gyrodyne." Examples of such aircraft are the XV-1 convertiplane tested in 1954 and the Rotodyne built by Fairey Aviation in 1962. The gyrodyne includes a thrust source providing thrust in a flight direction and a rotor providing autorotative lift at cruising speeds. Jet engines located on the tip of each rotor blade provided rotation of the rotor during takeoff, landing, and hovering.

Although typical rotorcraft provide the significant advantage of vertical takeoff and landing (VTOL), they are much more limited in their maximum flight speed than are fixed-wing aircraft. One reason that prior rotorcraft are unable to achieve high flight speed is a phenomenon known as "retreating blade stall."

In a fixed-wing aircraft, all wings move forward in fixed relation with respect to one another and the airframe. However, as a rotorcraft moves in a flight direction, rotation of the rotor causes each blade thereof to be either "advancing" or "retreating." A blade is advancing if it is moving in the same direction as the flight direction. A blade is retreating if it is moving opposite the flight direction. Thus, the velocity of any point on any blade is the velocity of that point, with respect to the airframe, plus the velocity of the airframe.

Rotor blades are airfoils that provide lift based on the speed of air flow thereover. Accordingly, the advancing blade typically experiences much greater lift than the retreating blade. If left uncheck, this disproportionate lift may render the rotorcraft unflyable. One solution to this problem is allowing the rotor blades to "flap." Flapping enables rotorcraft to travel in a direction substantially perpendicular to the axis of rotation of the rotor.

With flapping, an advancing blade is allowed to fly or flap upward in response to the increased air speed thereover, thereby reducing the blade's angle of attack. This, in turn, reduces the lift generated by the advancing blade. A retreating blade experiences less air speed and tends to fly or flap downward such that its angle of attack is increased. This, in turn, increases the lift generated by the retreating blade. In this manner, flapping balances the lift generated by the advancing and retreating blades.

However, lift equalization due to flapping is limited by retreating blade stall. As noted above, flapping of the rotor blades increases the angle of attack of the retreating blade. At certain higher speeds in the direction of flight, the increase in the blade angle of attack required to equalize lift results in loss of lift (stalling) of the retreating blade.

A second limit on the speed of rotorcraft is the drag at the tips of the rotor blades. The tip of the advancing blade is moving at a speed equal to the speed of the aircraft relative to the surrounding air, plus the speed of the tip of the blade with respect to the aircraft. Thus, the speed at the tip of an advancing blade is equal to the sum of the flight speed of the rotorcraft plus the product of the length of the blade and the angular velocity of the rotor.

In helicopters, the rotor must rotate to provide both upward lift and thrust in the direction of flight. Increasing the speed of a helicopter increases the air speed at the tip, both because of the increased flight speed as well as the increased angular velocity of the rotors required to provide supporting thrust. The speed at the tip of the advancing blade could therefore approach the speed of sound, even when the flight speed of the rotorcraft was actually much less. As the air speed over the tip approaches the speed of sound, the drag on the blade becomes greater than the engine can overcome. Accordingly, helicopters are quite limited in how fast they can fly.

In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotorcraft is reverse air flow over the retreating blade. As noted above, the retreating blade is traveling opposite the flight direction with respect to the airframe. At certain high speeds in the direction of flight, portions of the retreating blade may move rearward, with respect to the airframe, slower than the flight speed of the airframe. Accordingly, the direction of air flow over those portions of the retreating blade is reversed from that typically designed to generate positive lift.

Rather then generating positive lift, reverse air flow may impose negative lift, or a downward force, on the retreating blade. That is, an airfoil with positive angle of attack in a first direction has a negative angle of attack in a second direction, opposite the first direction.

The ratio of air speed of a rotorcraft in the direction of flight to the maximum corresponding air speed at the tips of the rotor blades is known as the "advance ratio." The maximum advance ratio of currently available rotorcraft is less than 0.5. For most helicopters, the maximum achievable advance ratio is between about 0.3 and 0.4. Accordingly, current rotorcraft are limited to a top flight speed of about 200 miles per hour (mph) or less.

Rotorcraft are typically equipped with rotor blades having a fixed geometry in terms of chord and twist. The rotor blade geometry of such rotorcraft cannot be changed once the blade has been manufactured and fitted to the rotorcraft. Several efforts have been made to address this limitation. Such efforts typically focus on adding flaps to a rotor blade. These flaps are controlled in the same way as flaps on fixed wing aircraft.

Another method that has been tried in experimental aircraft is circulation control based on the Coanda effect. In such embodiments, compressed air is released from a longitudinal slot positioned at either the leading edge, trailing edge, or both. The compressed air exiting the rotor blade acts like a leading or trailing edge slat or flap, effectively changing the functional geometry of the blade.

However, flaps add significant complexity to the rotor blade of a rotorcraft. Similarly, circulation control requires delivery of relatively high temperature air through the interior of a rotor blade. This may substantially increase the cost of manufacturing such a rotor blade. Additionally, control of the compressed air may also require significant complexity, such as the use of piezo crystal controllers. Furthermore, providing the compressed air to a rotor blade may require considerable power, which is usually not available for rotorcraft during hover.

In view of the foregoing, it would be an advancement in the art to provide a rotor blade exhibiting different geometries configured to match or better fit the particular task as hand (e.g., VTOL, horizontal flight, high speed flight, etc.). It would also be an advancement in the art to provide a rotor blade that is easy to maintain.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

The lift and drag produced by an airfoil is proportional to the square of the speed at which it is traveling through the surrounding air (i.e., airspeed) and directly proportional to the effective angle of attack of the airfoil. For a constant rotational velocity, the airspeed at any given point along a rotor blade is proportional to its radial distance from the axis of rotation. Accordingly, the airspeed at the tip of a rotor blade is much higher than the airspeed at the root of the rotor blade.

Due to the disparity in airspeed, the distal or outboard portions of an untwisted rotor blade may produce much greater lift than the proximal or inboard portions of the blade. This is aerodynamically inefficient and, depending on the type of rotor, can generate large moments at the hub.

To account for this disproportionate lift, many helicopter rotor blades are constructed with twist. The twist may provide a lower or minimum angle of attack at the tip and a maximum angle of attack at the root. Accordingly, twist may provide a more even distribution of lift across the span of a rotor blade.

Most helicopters operate with a constant rotor speed with thrust from the rotor being controlled by adjustments to the pitch of the blades. Rotors with blades having high twist tend to perform better in hover. Conversely, rotors with blades having low twist tend to perform better in horizontal flight, due to lower drag. Accordingly, helicopter rotor designers must compromise on blade twist to meet the mission goals of the rotorcraft.

Unlike helicopters, gyroplanes and gyrodynes have fluctuating rotor speed. Rotor speed of gyroplanes and gyrodynes may vary with the gross weight of the rotorcraft, maneuver loads, jump takeoff requirements, and, for gyrodynes, the transition between powered rotation and autorotation. In selected embodiments, this change in rotor speed may be used to trigger or motivate changes in the twist of a rotor blade. For example, a rotor blade may exhibit tension-torsion coupling.

In certain embodiments, a rotor blade may utilize tension-torsion coupling to change the twist of the rotor blade to better match the operating condition of the rotorcraft. Tension-torsion coupling may be achieved through selection of blade geometry and the use of fiber reinforced composite materials. The blade geometry and orientation of structural fibers may be selected such that when a specific centrifugal force (e.g., tension), dictated by rotor speed, is imposed on the blade, a twist is simultaneously produced within or over its span.

One may think of the twist being the result of fibers wrapped around the blade and trying to unravel when acted on by a centrifugal force, much like the behavior of a tension-torsion spring. By controlling the placement and direction of the fibers, twist along the span of the blade may be accurately controlled.

In selected embodiments, fibers proximate the root of a rotor blade may be preferentially oriented to increase the angle of attack with increases in centrifugal force. Conversely, fibers proximate the tip of the rotor blade may be preferentially oriented to decrease the angle of attack with increases in the centrifugal force. Such embodiments may improve jump takeoff performance.

For example, prior to jump takeoff, a rotor may be pre-rotated to a rotational velocity significantly higher than that used in normal forward flight. The centrifugal force associated with the higher prerotation speed may induce a blade twist ideal for hovering. Thus, when the rotorcraft takes off (e.g., executes a jump take off), the rotor may be well suited to the particular operation at hand.

Following the jump takeoff, the rotorcraft may transition to forward flight. The rotational velocity of the rotor may slow to its normal operating speed. At this lower rotational velocity, the centrifugal force may be significantly reduced. Accordingly, the rotor blades may relax into a twist distribution (e.g., zero twist, or zero change in twist) optimized or better suited for forward flight. This embodiment may also be employed by a gyrodyne performing a powered vertical takeoff and subsequent transition to autorotative flight.

Other embodiments in accordance with the present invention may include mechanically controlled tip weights that change the load path through a rotor blade. The load paths may be configured or selectively altered to induce a physical twist in the rotor blade. Mechanically controlled tip weights may be incorporated into the tension-torsion coupling systems in accordance with the present invention. As previously described, the induced twist distributions may correspond to specific flight conditions of a gyroplane or gyrodyne rotor.

In certain embodiments, a mission-adaptive rotor blade in accordance with the present invention may be configured to change its aerodynamic profile. This may be done by pneumatically expanding one or more bladders (i.e., or other actuators) inside the rotor blade. The one or more bladders may act on semi rigid portions of the rotor blade, causing one or more portions of a rotor blade to flex, contract, or swell. Changes in the blade geometry may increase or decrease the chord thickness, camber, or the like, or some combination thereof.

Bladders with different effects on the blade profile may be added or distributed span-wise down the length of a rotor blade. Such bladders may enable different regions of the rotor blade to take on different profiles suitable for the operating condition of that blade region. These conditions may include the driving and driven portions of a rotor in autorotation or changes to support an efficient jump takeoff and or efficient hovering in the case of a gyrodyne.

In selected alternative embodiments, each rotor blade may include a torsion tube. The torsion tube may control a span-wise twist on the blade. In such embodiments, one or more torsion tubes may extend from the blade root and attach to the blade tip or proximate thereto. A torque may be applied proximate the blade root to the one or more torsion tubes by an actuator. The one or more torsion tubes may conduct the torque to the tip of the rotor blade. The torque applied to the tip of the rotor blade may induce a twist within the rotor blade.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 1:
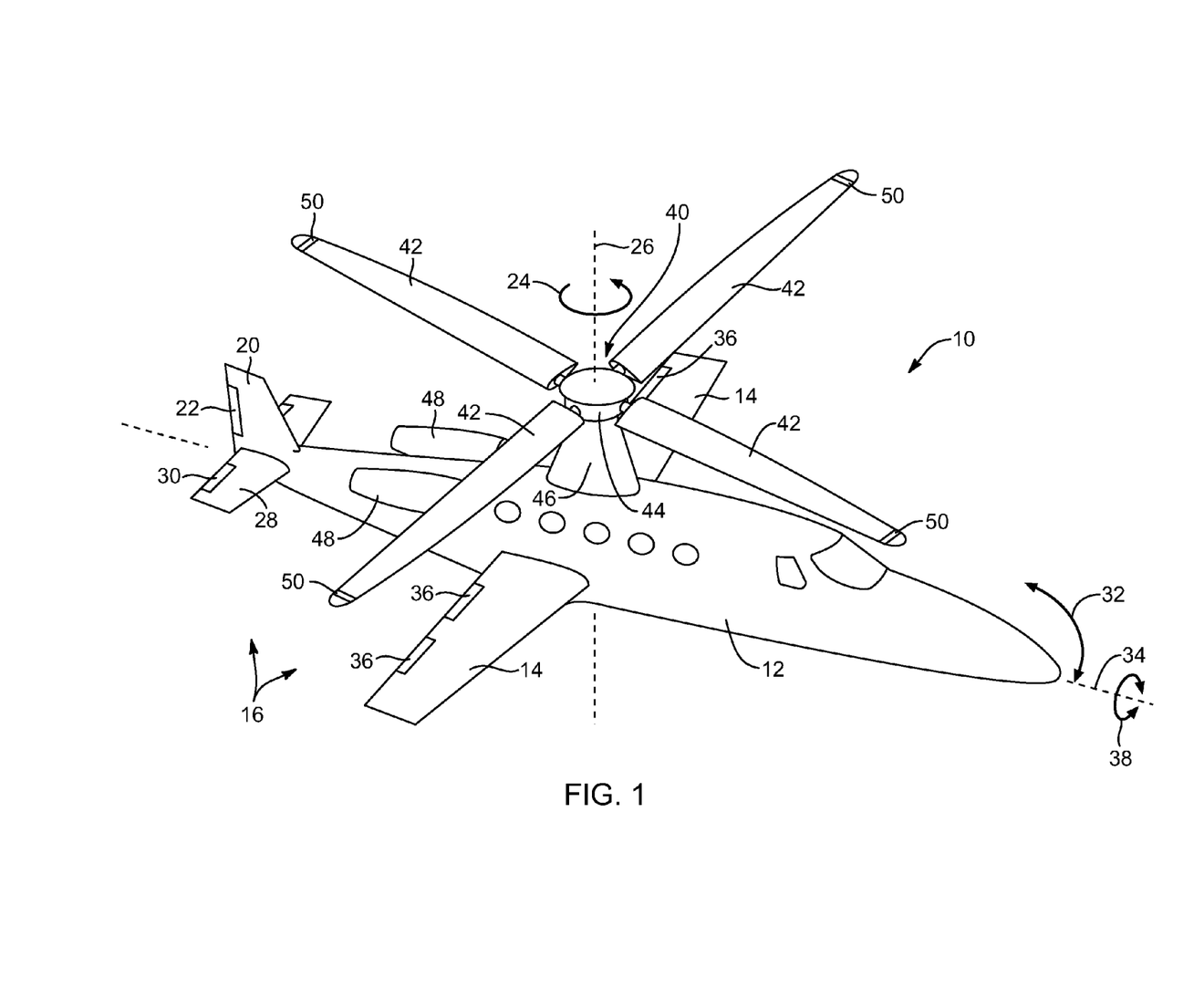
FIG. 1 is a perspective view of a rotorcraft in accordance with one embodiment of the present invention, the rotorcraft having two engines and one rotor.

Referring to FIG. 1, a rotorcraft 10 in accordance with the present invention may include an airframe 12 defining a cabin for carrying an operator, passengers, cargo, or the like. The airframe 12 may include one or more fixed wings 14 or airfoils 14 providing lift to the rotorcraft 10. The wings 14 may be configured such that they provide sufficient lift to overcome the weight of the rotorcraft 10 (or any significant portion thereof) only at comparatively high speeds.

That is, a rotorcraft 10 may be capable of vertical takeoff and landing (VTOL) and may not need lift from the fixed wings 14 at low speeds (e.g., below 50 mph or even 100 mph). Accordingly, the wings 14 may be made smaller than those of fixed-wing aircraft requiring a high velocity takeoff. The smaller wings 14 may result in lower drag at higher velocities. In some embodiments, the wings 14 may provide sufficient lift to support at least 50 percent, preferably about 90 percent, of the weight of the rotorcraft 10 at air speeds above 200 mph.

Control surfaces 16 may form part of an airframe 12. For example a tail structure 18 may include one or more vertical stabilizers 20 and one or more rudders 22. The rudders 22 may be adjustable to control yaw 24 of the rotorcraft 10 during flight. As known in the art, yaw 24 is defined as rotation about a vertical axis 26 of the rotorcraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable to alter pitch 32 of the rotorcraft 10. As known in the art, pitch 32 is defined as rotation about an axis extending laterally with respect to the airframe 10. In the illustrated embodiment, the elevator 30 is a hinged portion of the horizontal stabilizer 28. In some embodiments, twin rudders 22 may be positioned at an angle relative to the vertical axis 26 and serve both to adjust or control yaw 24 and pitch 32 of the rotorcraft 10.

The control surfaces 16 may also include ailerons 36 on the wings 14. Ailerons 36 may be used to control roll 38 of the rotorcraft 10. As known in the art, roll 38 is defined as rotation about the longitudinal axis 34 of the rotorcraft 10.

Lift during vertical takeoff and landing, and for augmenting lift of the wings 14 during flight, may be provided by a rotor 40. A rotor 40 may comprise a number of individual rotor blades 42 extending radially away from a hub 44. The hub 44 may be coupled to a mast 46. The mast may extend to connect the hub 44 to the rest of the airframe 12.

Figure 2:
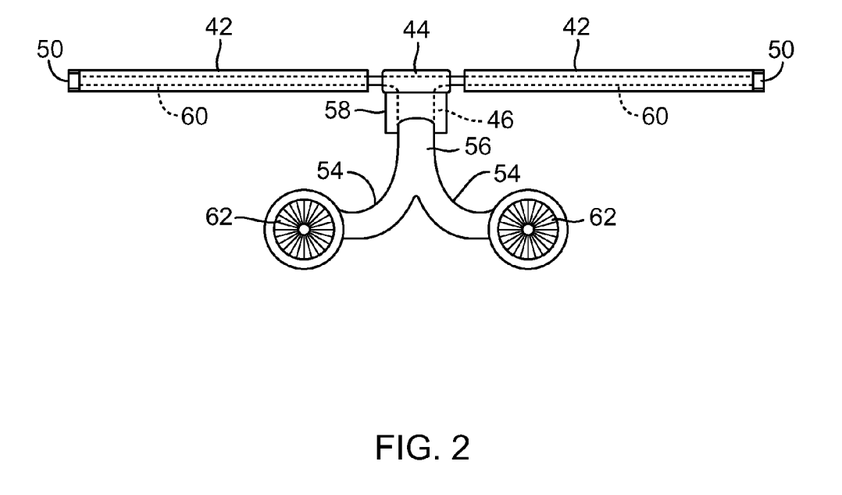
FIG. 2 is a schematic front elevation view of a compressed or otherwise pressurized air supply for tip jets in accordance with one embodiment of the present invention.

Referring to FIG. 2, a rotor 40 may be coupled to one or more engines 48 housed in a fuselage portion of the airframe 12 or in one or more adjacent nacelles. The engines 48 may provide thrust during flight of the rotorcraft 10. The engines 48 may also generate compressed air for the tip jets 50.

For example, in selected embodiments, the engines 48 may comprise one or more bypass turbines 62. All or a portion of the bypass air from the turbines 62 may be directed to the tip jets 50. Alternatively, the engines 48 may drive one or more auxiliary compressors, which in turn may provide the compressed air for the tip jets 50. In still other embodiments, all or a portion of the compressed air may be generated by one or more dedicated, single purpose engines, motors, or the like. Using the compressed air, the tip jets 50 may power the rotor 40 during takeoff, landing, hover, or whenever the flight speed of the rotorcraft 10 is too low for sufficient lift from autorotation of the rotor 40.

In selected embodiments, the compressed air generated by the engines 48 may be conducted to the tip jets 50 via one or more conduits or ducts 54, 55. For example, bypass air from one or more bypass turbines 62 may be transmitted through ducts 54 to a plenum 56. The plenum 56 may be in fluid communication via ducting 55 with a mast 46 that is hollow or has another passage to provide for air conduction. For example, a mast fairing 58 positioned around the mast 46 may provide one or both of an air channel and a low drag profile for the mast 46. The mast 46 or mast fairing 58 may be in fluid communication with a hub 44. Finally, the hub 44 may be in fluid communication with an interior conduit 60 within each of the various rotor blades 42. Accordingly, the compressed air may travel radially within the interior conduits 60 to feed the corresponding tip jets 50.

Figure 3A:
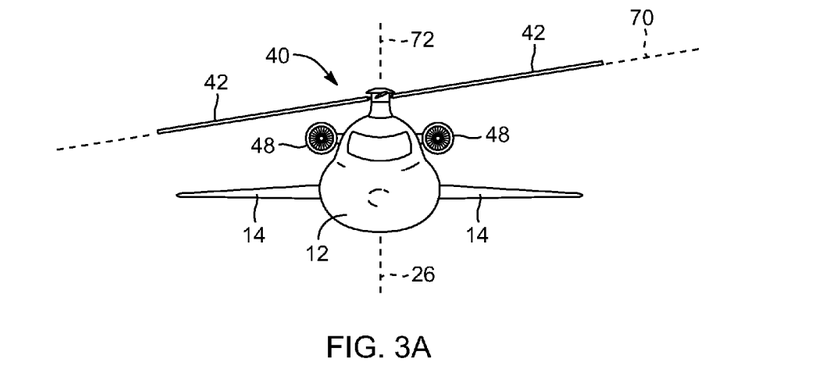
FIG. 3A is a front elevation view of a rotorcraft illustrating operational parameters describing a rotor configuration suitable for use in accordance with the present invention and the system of FIGS. 1 and 2 in particular.
Figure 3B:
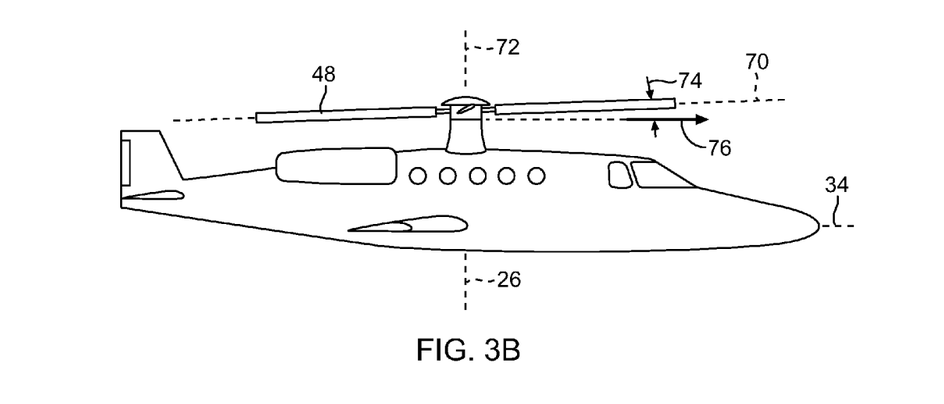
FIG. 3B is a right side elevation view of the rotorcraft of FIG. 3A.
Figure 3C:
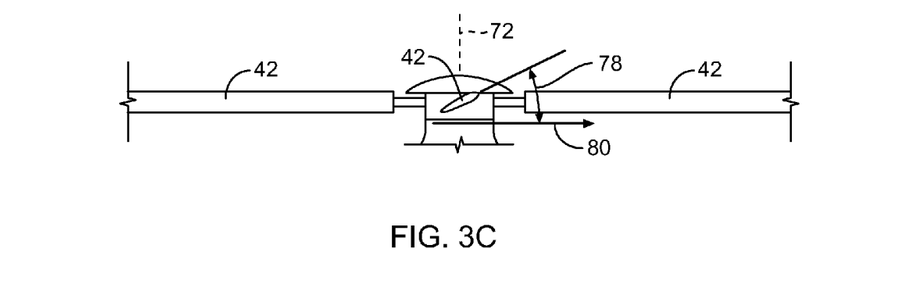
FIG. 3C is a partial cut of a right side elevation view of the rotor of FIG. 3A.

Referring to FIGS. 3A-3C, rotation of the rotor 40 about its axis of rotation occurs in a rotor disc 70 that is generally planar but may be contoured due to flexing of the blades 42. In general, the rotor disc 70 may be defined as a space in which the tips of the blades 42 travel. Inasmuch as the blades 42 flap cyclically upward and downward due to changes in lift while advancing and retreating, the rotor disc 70 may be angled or contoured with respect to the axis of rotation when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the rotor angle of attack 74 or rotor disk angle of attack 74. For purposes of this application, flight direction 76 and air speed refer to the direction and speed, respectively, of the airframe 12 of the rotorcraft 10 relative to surrounding air. In autogyro systems, the angle of attack 74 of the rotor disc 70 is generally positive in order to achieve autorotation of the rotor 40 and the resulting lift.

Referring to FIG. 3C, the surfaces of the rotor blades 42, and particularly the chord of each blade 42, define a pitch angle 78, or blade angle of attack 78, relative to the direction of movement 80 of the rotor blades 42. In general, a higher pitch angle 78 will result in more lift and higher drag on the rotor blade 42, up to the point where stalling occurs (at which point lift has declined below a value necessary to sustain flight). The pitch angle 78 of the rotor blade 42 may be manipulated by both cyclic and collective pitch controls.

Figure 4:
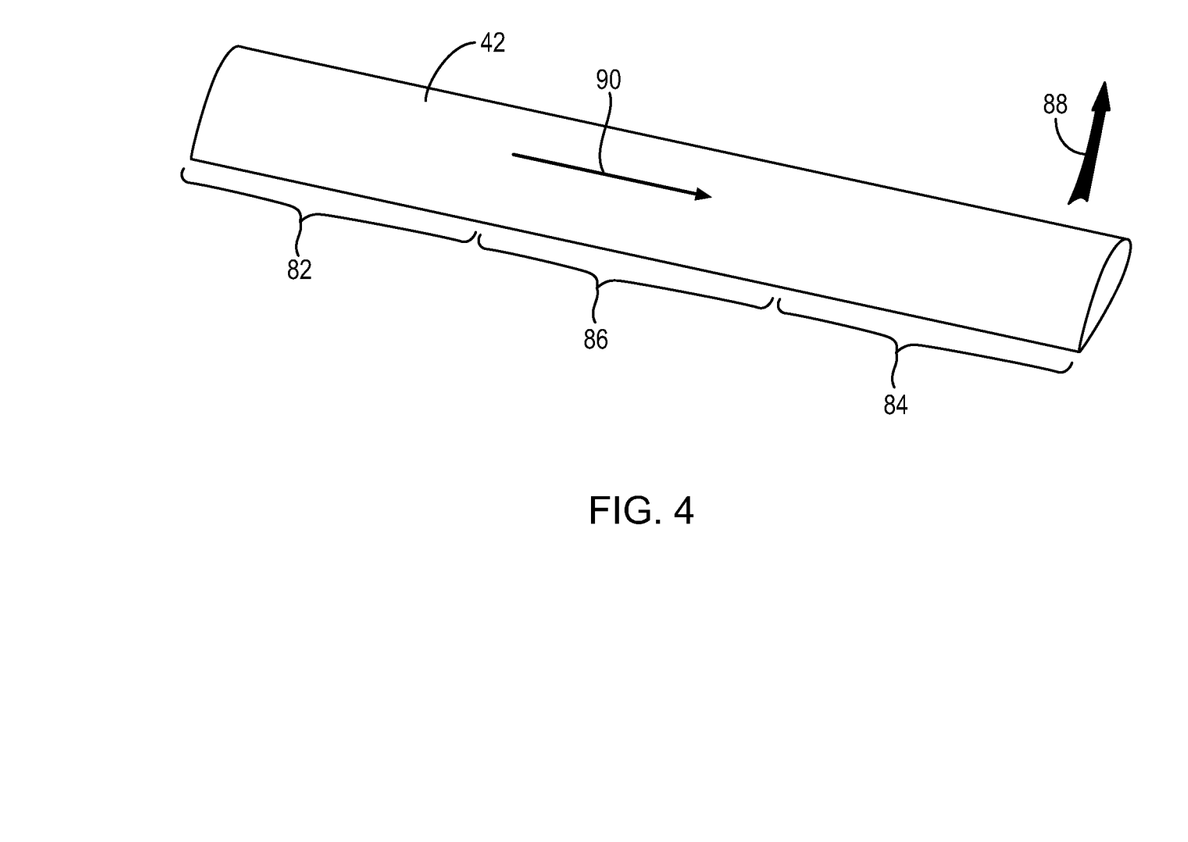
FIG. 4 is a perspective view of a portion of an untwisted rotor blade in accordance with the present invention.

Referring to FIG. 4, a rotor blade 42 in accordance with the present invention may include a root, tip, root portion 82 located proximate the root, and tip portion 84 located proximate the tip. In certain embodiments, an intermediate portion 86 may separate a root portion 82 from a tip portion 84. Alternatively, the intermediate portion 86 may be omitted and the root and tip portions 82, 84 may directly border one another.

The lift and drag produced by a portion of a rotor blade 42 may be proportional to the square of the speed at which it is traveling through the surrounding air (i.e., airspeed). For a constant rotational velocity 88, the airspeed at any given point along a rotor blade 42 may be proportional to its distance in the radial direction 90 from the axis of rotation. Accordingly, the airspeed at the tip portion 84 of a rotor blade 42 may be much higher than the airspeed at the root portion 82 of the rotor blade 42.

Due to this disparity in airspeed, the tip portion 84 of a rotor blade 42 may, if left unchecked, produce much greater lift than the root portion 82 of the rotor blade 42. This imbalance would be aerodynamically inefficient. It may also, depending on the type of rotor 40, generate large, undesirable moments in the blade 42 and at the hub 44.

Figure 5:
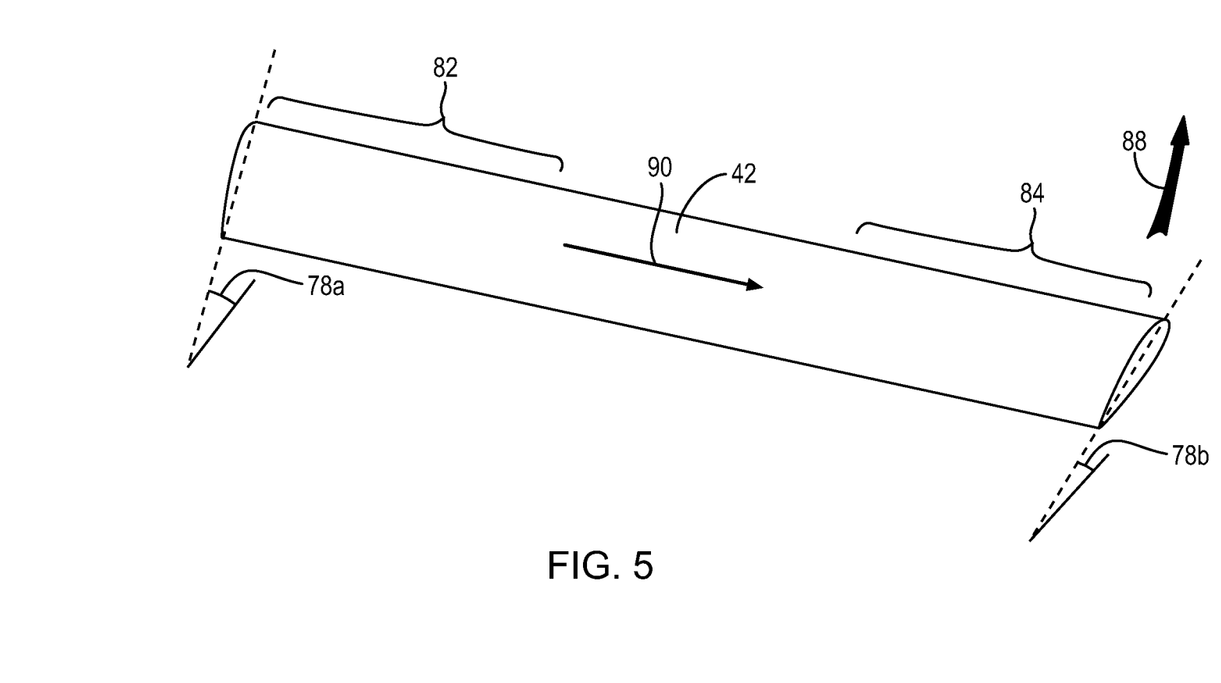
FIG. 5 is a perspective view of a portion of a twisted rotor blade in accordance with the present invention.

Referring to FIG. 5, the lift and drag of a portion of a rotor blade 42 may be directly proportional to the effective angle of attack 78 thereof. Accordingly, to better balance the lift between the root and tip portions 82, 84, a rotor blade 42 in accordance with the present invention may be configured to selectively twist. Twist may consist of a differential between the angles of attack 78a, 78b at various locations or portions of a rotor blade 42.

In general, the greater the twist the greater the differential. When balancing the lift between the root and tip portions 82, 84 of a rotor blade 42, the twist of the blade 42 may provide a maximum angle of attack 78a proximate the root and a minimum angle of attack 78b proximate the tip. Accordingly, twist may provide a more even distribution of lift across the span of a rotor blade 42.

Most helicopters operate with a constant rotor speed with thrust from the rotor 40 being controlled by adjustments to the pitch of the blades 42. Rotors 40 with blades 42 having high twist tend to perform better in hover. Conversely, rotors with blades having low twist tend to perform better in horizontal flight, due to lower drag. Accordingly, helicopter rotor blades represent a compromise on blade twist to meet the mission goals of the rotorcraft.

Unlike helicopters, gyroplanes and gyrodynes may fluctuate in rotor speed during flight. This fluctuation may include increases as large as 100% or more. Rotor speed of gyroplanes and gyrodynes may vary with the gross weight of the rotorcraft 10, maneuver loads, jump takeoff requirements, and, for gyrodynes, the transition between powered rotation and autorotation. In selected embodiments, changes in the rotational speed of a rotor 40 may be used to trigger or motivate changes in the twist of a rotor blade. For example, a rotor blade 42 in accordance with the present invention may be configured to exhibit (automatically or otherwise) greater twist at greater rotational speed.

In gyroplanes and gyrodynes, maneuvers corresponding to or generating higher rotor speeds are typically those that are improved by greater twist. For example, in a gyrodyne, VTOL and hover both require relatively high rotor speeds. Additionally, both are improved (e.g., made more efficient) by greater twist. That is, both VTOL and hover are improved by the greater (and better distributed) lift associated with increased twist. Conversely, autorotative horizontal flight requires a relatively low rotor speed. Additionally, autorotative horizontal flight is improved by less twist and the lower drag associated therewith.

Thus, by exhibiting greater twist at greater rotational speeds and less twist at lower rotational speeds, a rotor blade 42 in accordance with the present invention may adapt in flight to the particular mission or maneuver at hand. This may improve the performance of the rotorcraft 10 across a significant portion of its operational envelope. Moreover, a rotor blade 42 in accordance with the present invention may improve the performance of a rotorcraft 10 as a retrofit thereto, without requiring any alteration to the other structures or systems of the rotorcraft 10.

Figure 6:
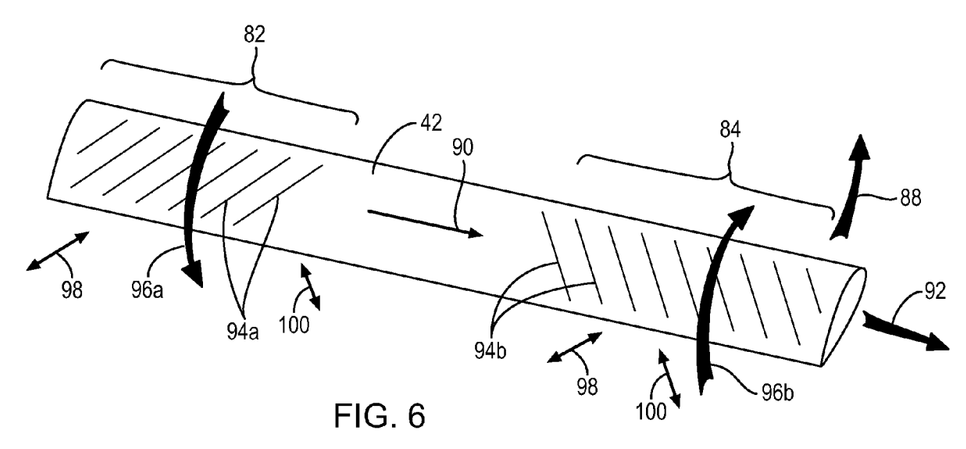
FIG. 6 is a perspective view of a portion of a rotor blade having one possible fiber arrangement in accordance with the present invention.

Referring to FIG. 6, in certain embodiments, a rotor blade 42 may utilize tension-torsion coupling to change the twist of the rotor blade 42 to better match the operating condition of the rotorcraft 10. Tension-torsion coupling may be achieved through selection of blade geometry and the use of fiber reinforced composite materials. The blade geometry and orientation of structural fibers may be selected such that when a specific centrifugal force 92 (e.g., a radially 90 directed tension load 92 dictated by rotor speed 88) is imposed on the blade 42, a twist is simultaneously produced within or over its span.

For example, various structural fibers may be used in the composition of a rotor blade 42. The structural fibers may be arranged in various orientations, overlays, and the like to provide a desired structural performance. Within the structural fibers may be a subset that may be considered biasing fibers 94. The biasing fibers 94 may be positioned and oriented in sufficient quantities and concentrations to bias a rotor blade 42 to a particular deflection 96 or twist 96 whenever the rotor blade 42 experiences an increase (e.g., a significant increase or increase to at least some threshold value) in the tension load 92 applied to the rotor blade 42.

One may think of this deflection 96 or twist 96 being the result of biasing fibers 94, wrapped around the blade 42, trying to unravel or unwrap when acted on by a centrifugal force 42. In this sense, the biasing fibers 94 may cause a rotor blade 42 to behave much like a tension-torsion spring. By controlling the placement and direction of the biasing fibers 94, twist 96 along the span of the blade 42 may be accurately controlled.

Various factors may be considered when selecting the orientations, concentrations, and the like for biasing fibers 94 and other structural fibers of a rotor blade 42. What may be suitable for rotor blades 42 of one rotorcraft 10 may be unsuitable for the rotor blades 42 of another. Factors that may affect the orientations, concentrations, etc. may include the structural characteristics of the material forming the fibers, structural characteristics of the material forming the matrix, chord geometry, blade length, blade construction, present or absence of tip weights, type or rotorcraft 10 (e.g., whether the rotorcraft 10 is a gyroplane or a gyrodyne), and the like.

In selected embodiments, biasing fibers 94a located proximate or within the root portion 82 of a rotor blade 42 may be preferentially oriented to cause (in response to an increase in the centrifugal force 92) a deflection 96a increasing the angle of attack 78a of the root portion 82. Conversely, biasing fibers 94b located proximate or within the tip portion 84 of a rotor blade 42 may be preferentially oriented to cause (in response to an increase in the centrifugal force 92) a deflection 96b decreasing the angle of attack 78b of the tip portion 84. The deflections 96a, 96b may be configured, coordinated, and controlled within the blade 42 itself such that a pilot of the corresponding rotorcraft 10 need not adjust the pitch (e.g., collective pitch) to correct for or counteract the twist produced.

In certain embodiments, biasing fibers 94 may encircle or wrap a rotor blade 42 in a spiraling arrangement. For example, the biasing fibers 94a corresponding to a root portion 82 may extending primarily in a first direction 98 on or within a first, top side of a rotor blade 42 and in a second direction 100, different form the first direction 98, on or within a second, bottom side of the rotor blade 42. In selected embodiments, the first and second directions 98, 100 may be substantially orthogonal with respect to one another.

The biasing fibers 94b of a tip portion 84 may similarly encircle or wrap the rotor blade 42, but in a different direction. For example, the biasing fibers 94b corresponding to a tip portion 84 may extend primarily in the second direction 100 on or within the first, top side of a rotor blade 42 and in the first direction 98 on or within the second, bottom side of the rotor blade 42. Accordingly, for a given side of the rotor blade 42, the biasing fibers 94a corresponding to the root portion 82 may be oriented substantially orthogonally with respect to the biasing fibers 94b corresponding to the tip portion 84.

A rotor blade 42 with biasing members 94 automatically imposing a particular deflection 96 or twist 96 in response to an increase in centrifugal force 92 may improve jump takeoff performance, VTOL performance, hover performance, or the like. For example, prior to jump takeoff, a rotor 40 may be prerotated to a rotational velocity 88 significantly higher than that used in normal forward flight. The centrifugal force 92 associated to the higher prerotation speed 88 may induce a blade twist (e.g., deflections 96a, 96b) better suited to hovering. Thus, when the rotorcraft 10 takes off (e.g., executes a jump take off), the rotor 40 may be well suited to the particular operation at hand.

Following the jump takeoff, the rotorcraft 10 may transition to forward flight. The rotational velocity 88 of the rotor 40 may slow to its normal operating speed 88. At this lower rotational velocity 88, the centrifugal force 92 may be significantly reduced. Accordingly, the rotor blades 42 may relax into a twist distribution (e.g., zero twist) optimized or better suited for forward flight.

Figure 7:
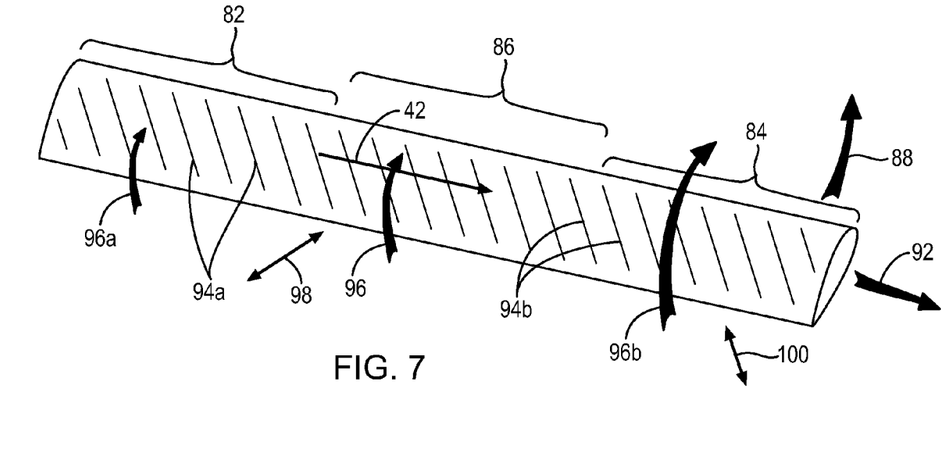
FIG. 7 is a perspective view of a portion of a rotor blade having an alternative fiber arrangement in accordance with the present invention.

Referring to FIG. 7, in certain embodiments, the biasing fibers 94a corresponding to the root portion 82 may be oriented substantially parallel with respect to the biasing fibers 94b corresponding to the tip portion 84. That is, biasing fibers 94a, 94b of both the root and tip portions 82, 84 (and potentially the biasing fibers 94c of the intermediate portion 86 as well) may encircle or wrap a rotor blade 42 in a similar or identical spiraling arrangement.

For example, the biasing fibers 94a, 94b corresponding to the root and tip portions 82, 84 may both extend primarily in the second direction 100 on or within the first, top side of a rotor blade 42 and in the first direction 98 on or within the second, bottom side of the rotor blade 42.

In selected embodiments, the biasing fibers 94 may all induce, in response to increases in the centrifugal force 92, deflection 96 in the same direction. Accordingly, each portion of the rotor blade 42 may start from and add to the deflection 96 produced by its inboard neighbors. Thus, the total accumulated deflection 96b at the tip portion 84 may be greater than the deflection 96a at the root portion 82. Likewise, the load at any point along a blade may vary with distance if weight of the blade is distributed.

In embodiments having accumulated twist, to prevent the angle of attack 78b at the tip from going negative, a pilot of the corresponding rotorcraft 10 may reduce the pitch (e.g., collective pitch) of the rotor blades 42 as the rotational speed 88 of the rotor 40 and corresponding twist increase. Thus, the maximum angle of attack 78a, which would be located at the root of the rotor blades 42, may be set by the pilot. The cumulative deflection 96 or twist may then reduce (e.g., gradually reduce) the angle of attack with increasing radial 90 distance from the root. Accordingly, the angle of attack 78b at the tip may be held (e.g., by the pilot) at zero or some relatively small positive value.

Figure 8:
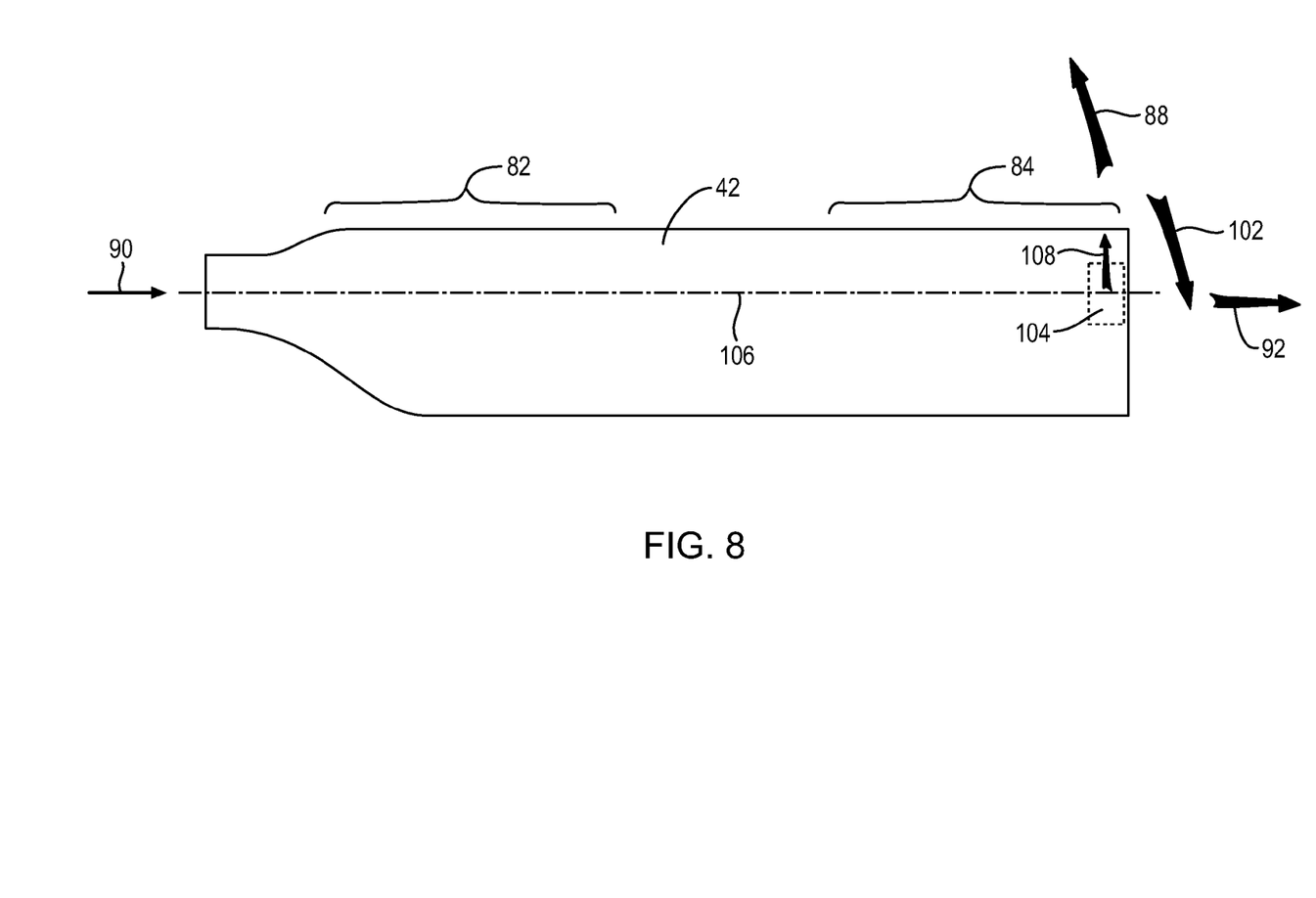
FIG. 8 is a top plan view of one embodiment of a rotor blade having a movable tip weight in accordance with the present invention.

Referring to FIG. 8, in selected embodiments, a rotor blade 42 may be configured to twist in response to a force other than tension 92 or centrifugal force 92. For example, biasing fibers 94 may be positioned and oriented in sufficient quantities and concentrations to bias a rotor blade 42 to a particular deflection 96 or twist 96 whenever the rotor blade 42 experiences a particular bending load 102.

Alternatively, biasing fibers 94 may be positioned and oriented in sufficient quantities and concentrations to bias a rotor blade 42 to a particular deflection 96 or twist 96 in response to both tension 92 and a bending load 102. Accordingly, in certain embodiments, the tension 92 and bending load 102 may augment each other in producing a desired deflection 96.

A bending load 102 may be generated in any suitable manner. In selected embodiments, a rotor blade 42 may include a mechanically controlled tip weight 104. By changing the position of the tip weight 104, a rotorcraft 10, operating automatically or under direction of a pilot, may selectively change the load path through a rotor blade 42.

For example, a line 106 may extend from an axis of rotation through the center of mass of a rotor blade 42. Under the impetus of centrifugal force 92, a rotor blade 42 may seek to align this line 106 with the radial direction 90. When a tip weight 104 is moved forward 108, the line 106 may move forward with respect to the rotor blade 42. Accordingly, centrifugal force 92 may induce a bending load 102 urging the line 106 back in alignment with the radial direction 90.

The position of tip weights 104 may be controlled in any suitable manner. In selected embodiments, the position of a tip weight 104 may be controlled using one or more cables. The actuator or actuators manipulating the cables may be located proximate the hub 44 of a rotor 40 to reduce the loads (e.g., centrifugal loads) applied thereto. Accordingly, the one or more cables may extend within and along the length of the rotor blade 42 to access the tip weight 104.

In certain embodiments, the position of a tip weight 104 may be controlled in accordance with rotor speed 88. Within the limits of the range of motion of the tip weight 104, the greater the rotational speed 88, the further forward 108 the tip weight 104 may be moved. In selected embodiments, a tip weight 104 may reach the most forward end of its range of motion at the greatest anticipated or desired operational rotation speed 88 of the rotor 40. Conversely, a tip weight 104 may reach the most rearward end of its range of motion at the lowest anticipated or desired operational rotation speed 88.

Figure 9:
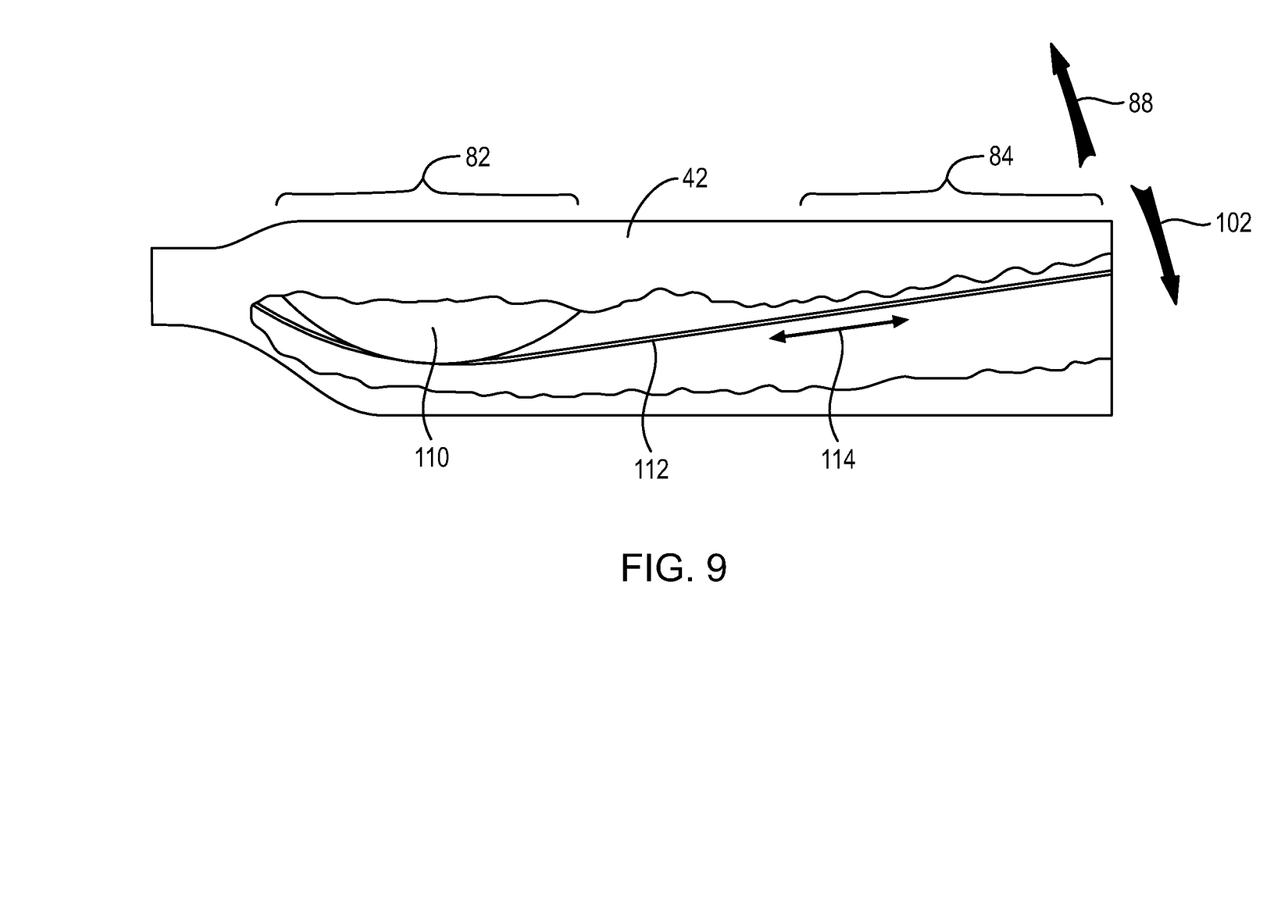
FIG. 9 is a partially cut-away, top plan view of one embodiment of a rotor blade having an inflatable bladder in accordance with the present invention.

Referring to FIG. 9, in certain embodiments, a mission-adaptive rotor blade 42 in accordance with the present invention may be configured to change its aerodynamic profile. This may be done by pneumatically expanding one or more bladders or other actuators inside the rotor blade 42. The one or more bladders may act on semi rigid portions of the rotor blade 42, causing one or more portions of a rotor blade 42 to flex, contract, or swell. Changes in the blade geometry may increase or decrease the chord thickness, camber, or the like, or some combination thereof.

Bladders with different effects on the blade profile may be added or distributed span-wise down the length of a rotor blade 42. Such bladders may enable different regions of the rotor blade 42 to take on different profiles suitable for the operating condition of that blade portion 82, 84, 86. These conditions may include the driving and driven portions of a rotor in autorotation or changes to support an efficient jump takeoff, efficient hovering in the case of a gyrodyne, or both.

In selected embodiments, pneumatic forces may be used to generate a bending load 102. This bending load 102 may act, alone or in combination with other forces (e.g., tension 92), on biasing fibers 94 to induce a desired deflection 96 or twist 96 within a rotor blade 42.

For example, in certain embodiments, a rotor blade 42 may house a bladder 110. The bladder 110 may act on one or more substantially inextensible elements 112. The elements 12 may be contained with in the rotor blade 42 and extend over the bladder 110 to engage the rotor blade 42 proximate the tip thereof. As the pressure with the bladder 110 is increased, the force with which the bladder 110 pushes against the elements 112 may increase. This may increase the tension 114 within the elements 112. The increased tension 114, in turn, may pull the tip of the rotor blade 42 backward, inducing a bending load 102 therein.

In certain embodiments, the pressure within a bladder 110 may be controlled in accordance with rotor speed 88. Within the limits of the bladder 110, the greater the rotational speed 88, the greater the pressure within the bladder 110. In selected embodiments, a bladder 110 may reach the highest pressure at the greatest anticipated or desired operational rotation speed 88 of the rotor 40. Conversely, a bladder 110 may reach the lowest pressure at the lowest anticipated or desired operational rotation speed 88. Such bladder or actuator activity may also be coupled with weights subjected to centrifugal force and thus applying more force at higher centrifugal speeds.

Figure 10:
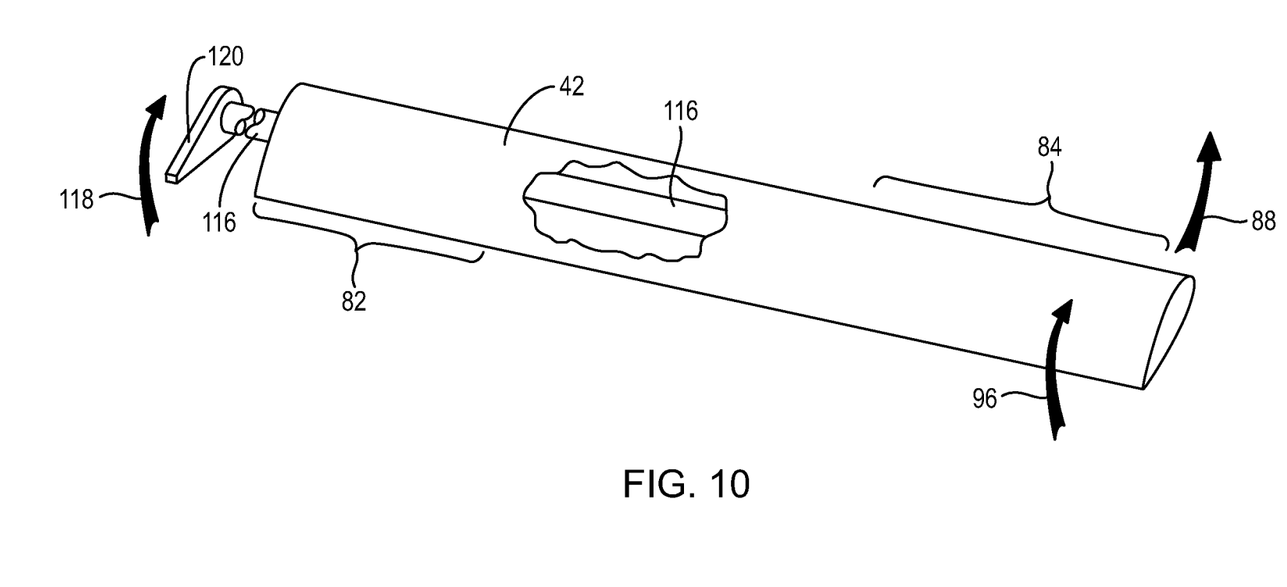
FIG. 10 is a partially cut-away, perspective view of a portion of a rotor blade having an internal torsion tube in accordance with the present invention.

Referring to FIG. 10, in selected alternative embodiments, each rotor blade 42 of a rotor 40 may include one or more torsion tubes 116. The torsion tubes 116 may control a span-wise twist 96 of the rotor blade 42. In such embodiments, one or more torsion tubes 116 may extend from the blade root and attach to the blade tip or proximate thereto. A torque 118 may be applied (e.g., via a lever arm 120, gear, pulley, or the like) proximate the blade root to the one or more torsion tubes 116 by an actuator. The one or more torsion tubes 116 may conduct the torque 118 to the tip of the rotor blade 42. The torque 118 applied to the tip of the rotor blade 42 may induce a twist 96 within the rotor blade 42.

The one or more actuators, linkages, or the like applying a torque 118 to the one or more torsion tubes 116 may be configured to maintain the torque 118 through changes in the pitch of the rotor blade 42. Accordingly, changes to the pitch of a rotor blade 42 may not, by themselves, increase or decrease the torque 118 applied to the one or more torsion tubes 116.

In selected embodiments, this may be accomplished by linking the lever arm 120 or other input device (e.g., gear, pulley, or the like) to the pitch control system to travel therewith. Thus, changes in pitch may result in changes to the position of the lever arm 20 or other input device to maintain the torque as it intended value. In such embodiments, the actuator or actuators corresponding to the lever arm 120 or other input device may act between the pitch control system and the lever arm 120 or other input device. That is, pitch inputs may travel through the actuators to reach the lever arm 120 or other input device.

In certain embodiments, the torque 118 applied to the torsion tubes 116 may be controlled in accordance with rotor speed 88. Within the limits of the torsion tubes 116, the greater the rotational speed 88, the greater the torque 118 applied. In selected embodiments, a torsion tube 116 may loaded with the greatest torque at the greatest anticipated or desired operational rotation speed 88 of the rotor 40. Conversely, a torsion tube 116 may be loaded with the lowest torque at the lowest anticipated or desired operational rotation speed 88.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A rotorcraft comprising:
an airframe; and
a rotor connected to the airframe and defining axial and radial directions, the rotor comprising
a hub,
a rotor blade connected to the hub to extend in the radial direction away therefrom, and
the rotor blade comprising biasing fibers oriented to increase twist of the rotor blade in response to a change in rotational speed of the rotor from a first value to a second value greater than the first value;
wherein the biasing fibers include first spiral fibers wound in a first direction around a root portion of the rotor blade and second spiral fibers wound around the a tip portion of the rotor blade in a second direction opposite to the first direction such that in response to changing in centrifugal force on the rotor blade first biasing fibers cause the root portion to twist opposite to the tip portion.

2. The rotorcraft of claim 1, wherein the rotor blade further comprises a root, tip, and longitudinal axis extending from the root to the tip.

3. The rotorcraft of claim 2, wherein the rotor blade further comprises a root portion located proximate the root and a tip portion located proximate the tip.

4. The rotorcraft of claim 3, wherein the biasing fibers are further oriented to increase the angle of attack of the root portion in response to the change in rotational speed of the rotor from the first value to the second value.

5. The rotorcraft of claim 4, wherein the biasing fibers are further oriented to decrease the angle of attack of the tip portion in response to the change in rotational speed of the rotor from the first value to the second value.

6. The rotorcraft of claim 3, wherein the biasing fibers comprise root biasing fibers corresponding to the root portion and tip biasing fibers corresponding to the tip portion.

7. The rotorcraft of claim 6, wherein the root biasing fibers corresponding to a given side of the rotor blade are oriented substantially orthogonally with respect to the tip biasing fibers corresponding to the given side.

8. A rotorcraft comprising:
an airframe; and
a rotor connected to the airframe and defining axial and radial directions, the rotor comprising
a hub,
a rotor blade connected to the hub to extend in the radial direction away therefrom, the rotor blade comprising a root, tip, root portion located proximate the root, and tip portion located proximate the tip, the root portion defining a root angle of attack, the tip portion defining a tip angle of attack, the rotor blade comprising biasing fibers oriented to increase the root angle of attack with respect to the tip angle of attack in response to an increase in the centrifugal force acting on the rotor blade, a weight positioned in the tip portion such that the weight is movable within the tip portion, and an actuator coupled to the weights and operable to change a position of the weight within the tip portion;

wherein the rotorcraft is configured to automatically cause the actuator to chance the position of the weight in response to a change in speed of the rotor.

9. The rotorcraft of claim 8, wherein:

the biasing fibers comprise root-biasing fibers corresponding to the root portion and tip-biasing fibers corresponding to the tip portion; and the root-biasing fibers corresponding to a given side of the rotor blade are oriented substantially orthogonally with respect to the tip-biasing fibers corresponding to the given side.

10. A method comprising:

selecting a rotorcraft comprising an airframe and a rotor, the rotor rotatably connected to the airframe and comprising a hub and a rotor blade, the rotor blade connected to the hub to extend radially away therefrom and comprising biasing fibers arranged in a spiral within the rotor blade;

rotating the rotor with respect to the airframe at an angular velocity having a first value;

increasing the centrifugal force acting on the rotor blade by transitioning the angular velocity of the rotor with respect to the airframe from the first value to a second value greater than the first value; and inducing automatically, by the biasing fibers in response to the increasing, greater twist in the rotor blade, wherein the biasing fibers comprise root-biasing fibers corresponding to a root portion and tip-biasing fibers corresponding to a tip portion, wherein the root-biasing fibers corresponding to a given side of the rotor blade are oriented substantially orthogonally with respect to the tip-biasing fibers corresponding to the given side.

11. The method of claim 10, wherein the transitioning comprises prerotating the rotor.

12. The method of claim 10, wherein the transitioning comprises executing an in-flight maneuver.

13. The method of claim 12, wherein the in-flight maneuver comprises hovering.

14. The method of claim 10, wherein the rotor blade further comprises a root, tip, the root portion located proximate the root, and the tip portion located proximate the tip, the root portion defining a root angle of attack, the tip portion defining a tip angle of attack.

15. The method of claim 14, wherein the greater twist comprises an increase in the root angle of attack with respect to the tip angle of attack.

16. The method of claim 15, further comprising adjusting, after the inducing, the pitch of the rotor blade to keep the tip angle of attack from going negative.

* * * * *